G. B. LUNDY.
AUXILIARY FLOOR FOR THRESHING MACHINES.
APPLICATION FILED JULY 30, 1918.

1,338,142.

Patented Apr. 27, 1920.
2 SHEETS—SHEET 1.

WITNESSES
F. C. Gibson

INVENTOR
George B. Lundy.
BY
ATTORNEYS

G. B. LUNDY.
AUXILIARY FLOOR FOR THRESHING MACHINES.
APPLICATION FILED JULY 30, 1918.

1,338,142.

Patented Apr. 27, 1920.
2 SHEETS—SHEET 2.

WITNESSES
F. C. Gibson

INVENTOR
George B. Lundy.
BY
ATTORNEYS

UNITED STATES PATENT OFFICE.

GEORGE B. LUNDY, OF NIAGARA FALLS SOUTH, ONTARIO, CANADA.

AUXILIARY FLOOR FOR THRESHING-MACHINES.

1,338,142.    Specification of Letters Patent.    Patented Apr. 27, 1920.

Application filed July 30, 1918. Serial No. 247,448.

*To all whom it may concern:*

Be it known that I, GEORGE B. LUNDY, a subject of the King of Great Britain, and a resident of Niagara Falls South, in the Province of Ontario and Dominion of Canada, have invented certain new and useful Improvements in Auxiliary Floors for Threshing-Machines, of which the following is a specification.

My invention is an improvement in auxiliary floors for threshing machines, and has for its object to provide means of the character specified for catching the falling grain from the feeder of the thresher, and wherein means is provided in connection with the said means for permitting the contents of the first sheet to be emptied into a partially closed receptacle for convenience in dumping the same.

Figure 1:
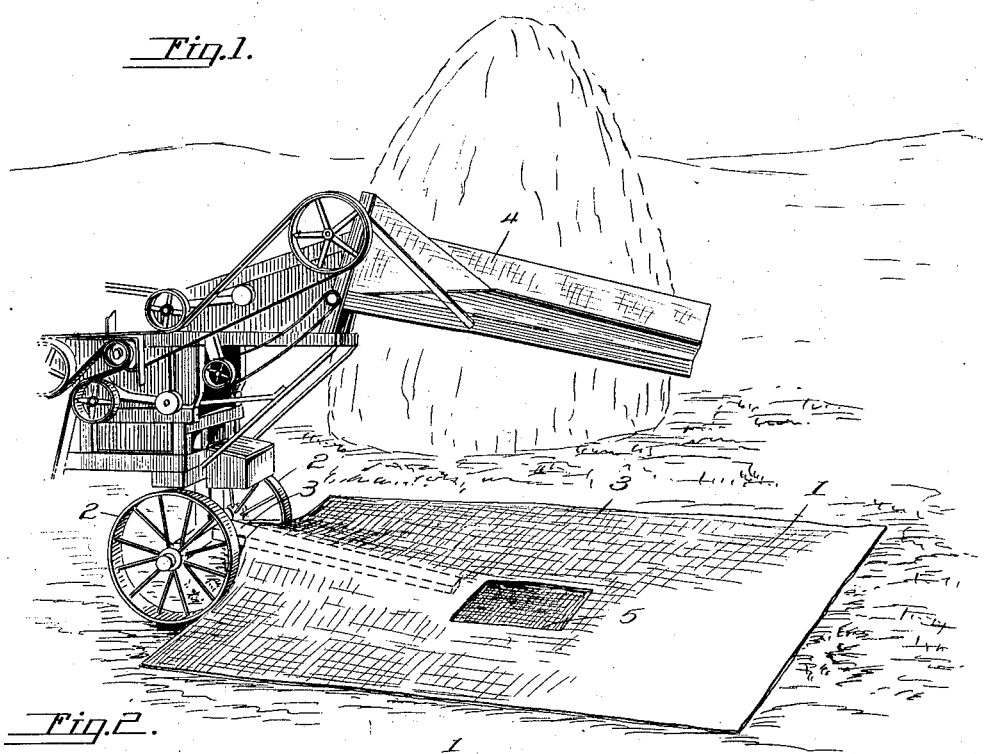
Figure 1 is a perspective view showing the improved floor in place.
Figure 2:
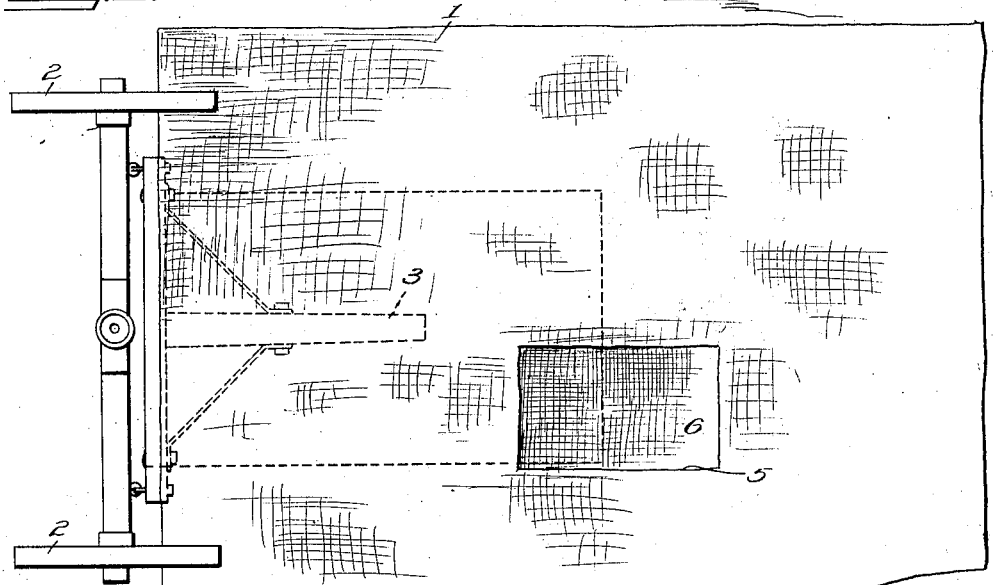
Fig. 2 is a top plan view.
Figure 3:
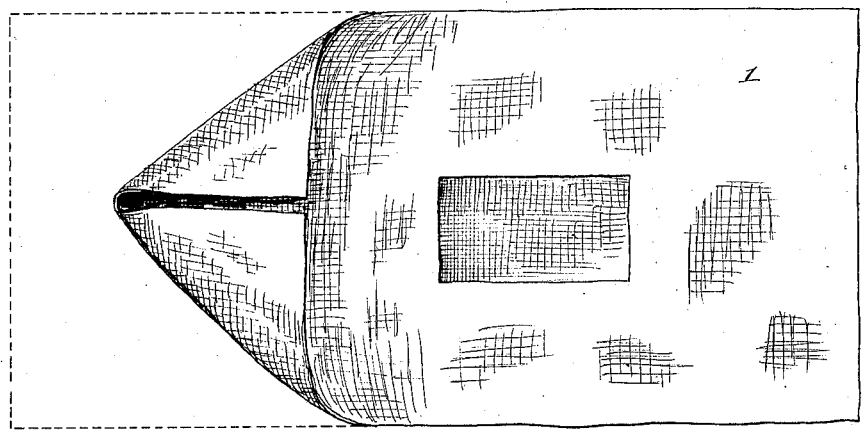
Fig. 3 is a top plan view of the auxiliary floor in dumping position.

As is known, in threshing grain in the field, there is a considerable waste, due to shattering from the rough handling during feeding, especially in those machines equipped with self-feeders. If a sheet of canvas, for instance, is spread beneath the feeder to receive this fallen grain, it is very difficult to empty the same into the machine after threshing or when, for any other reason, it is desirable, because of the large size and consequent unwieldiness of the sheet. Furthermore, it is difficult to properly close the sheet so that the grain will not fall out of the same during the lifting and emptying of the sheet.

To avoid this difficulty I provide a sheet with an opening of sufficient size and at any desired or convenient point in the surface of the sheet and arranged beneath this opening a second sheet, into which the grain from the first named sheet may be deflected, by the lifting of the corners and side edges of the first named sheet, the second named sheet having means for partially forming the same into a container for convenience in dumping.

With this object in view, I provide a sheet 1 of flexible material, and preferably of fabric material, as, for instance, canvas or the like, of sufficient size to extend from the wheels 2 of the thresher to a point beyond the outer end of the free end of the tongue 3, and of a width to extend from outside of one wheel to outside of the other. This sheet is directly below the self-feeder 4 of the thresher, and will receive the fallen grain from the feeder. At any desired point in the said sheet I provide an opening 5 of suitable size, and preferably to one side of the tongue, through which the grain that falls upon the sheet 1 may be deflected, by lifting the corners and side edges of the sheet 1, to empty the said sheet of the grain that has fallen thereon.

Beneath the sheet 1 and at this opening 5 I arrange a second sheet 6 of similar material to that of the sheet 1 and of a size somewhat greater than that of the opening 5, so that the said sheet 6 will extend well beyond the edges of the opening 5. This second sheet is for receiving the grain which is deflected through the opening 5 in the manner above mentioned, and mechanism is provided in connection with this second sheet for permitting it to be formed into a species of container having raised side walls and partially open ends to facilitate the dumping of the grain.

Along one side edge of the sheet 6 I arrange a series of rings 7, securing them to the sheet in any suitable or desired manner, and to the opposite side edge I secure a series of flexible members 8 and 9, the flexible members corresponding in position to the position of the rings. These flexible members are secured to the sheet in any suitable or desired manner, and the free end of each member is provided with a snap hook 10 for engaging the adjacent ring at the opposite side. Thus when the contents of the first sheet 1 have been dumped into the second sheet 6, the side edges may be raised and may be connected by means of the flexible members, to hold the said side edges in such position that the grain cannot flow out at the sides. The flexible members 9, which are arranged at the ends of the sheet, are contractible, so that the side edges may be drawn together at the ends of the sheet.

Figure 4:
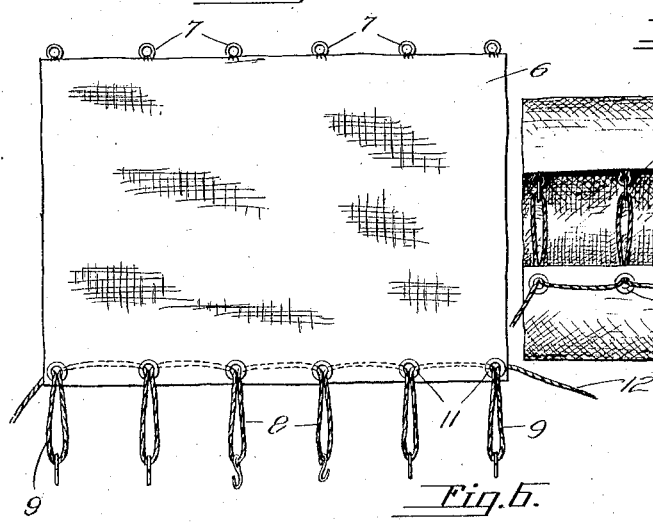
Fig. 4 is a top plan view of the second sheet or container in open position.
Figure 5:
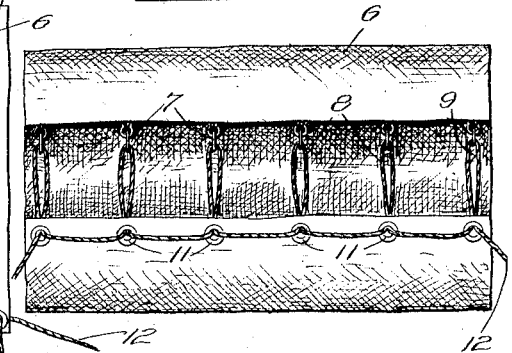
Fig. 5 is a similar view in partially closed position.
Figure 6:
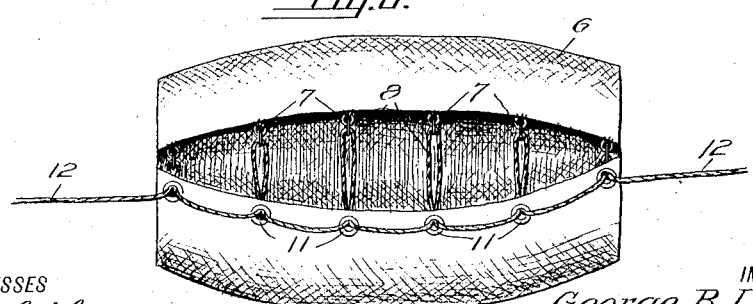
Fig. 6 is a similar view showing the said sheet closed and ready for dumping.

Referring to Figs. 4, 5 and 6, it will be noted that the flexible members 8 are in the form of loops, formed by a cord which is passed through eyelets 11 in the sheet 6. A loop of the said cord is drawn through each eyelet in succession, and it will be evident that by pulling on the ends 12 of the cord, the endmost loops 9 will be contracted to draw the ends together, as shown in Fig. 6, while at the same time the adjacent loops will also be slightly contracted, the innermost loops, however, being held in lengthened or extended position by the weight of the grain in the partially formed container.

As is known, it is a task of considerable difficulty to empty a large canvas or tarpaulin such as is generally used about threshing machines to catch the fallen shattered grain, requiring, as a rule, a number of men to handle the same. With the present embodiment of the invention, one man can empty the sheet 1, and two can easily handle the sheet 6, one at each end, using the ends 12 of the cord as handles.

I claim:

1. An auxiliary floor for threshing machines, comprising a sheet of flexible material adapted to be spread beneath the feeder to the thresher to catch the falling grain, said sheet having an opening therein, and an independent sheet of greater size than the opening arranged beneath the first named sheet at the opening for receiving the grain from the larger sheet, said second sheet having means for forming the same into a receptacle.

2. An auxiliary floor for threshing machines, comprising a sheet of flexible material adapted to be spread beneath the feeder of the thresher to catch the falling grain, said sheet having an opening therein, and an independent sheet of greater size than the opening arranged beneath the first named sheet at the opening for receiving the grain from the larger sheet.

GEORGE B. LUNDY.